United States Patent
Jeske et al.

(10) Patent No.: US 6,825,282 B2
(45) Date of Patent: *Nov. 30, 2004

(54) DIENE RUBBER COMPOUNDS FOR IMPROVED RUBBER MOLDINGS

(75) Inventors: Winfried Jeske, Burscheid (DE); Hartmuth Buding, Titz (DE); Hermann-Josef Weidenhaupt, Pulheim (DE)

(73) Assignee: Bayer Aktiengesellschaft, Leverkusen (DE)

( * ) Notice: Subject to any disclaimer, the term of this patent is extended or adjusted under 35 U.S.C. 154(b) by 6 days.

This patent is subject to a terminal disclaimer.

(21) Appl. No.: 09/575,051

(22) Filed: May 19, 2000

(65) Prior Publication Data

US 2002/0058760 A1 May 16, 2002

(30) Foreign Application Priority Data

Jun. 4, 1999 (DE) .......................................... 199 25 633

(51) Int. Cl.$^7$ ........................ C08C 19/20; C08F 210/16
(52) U.S. Cl. ................................ 525/331.8; 525/332.7
(58) Field of Search ............................. 525/331.8, 332.7

(56) References Cited

U.S. PATENT DOCUMENTS

| | | | |
|---|---|---|---|
| 3,979,369 A | 9/1976 | Trivette, Jr. | |
| 5,342,900 A | 8/1994 | Wolpers et al. | 525/329.3 |
| 5,717,038 A | 2/1998 | Horpel et al. | 525/332.4 |
| 6,359,045 B1 * | 3/2002 | Jeske et al. | 524/201 |

FOREIGN PATENT DOCUMENTS

| | | |
|---|---|---|
| CA | 2289434 | 5/2000 |
| EP | 0 305 590 | 12/1991 |
| EP | 0 385 073 | 6/1995 |

OTHER PUBLICATIONS

Chauvin, B., Vulcanizable rubber compositions etc (CA 124:263213, 1996.).*
Nordsiek, K. H. et al DN122:135730.*
Wolpers, J. et al DN120:10211.*
KGK Kautschuk Gummi Kunstoffe 47, (month unavailable) No. 5, 1994, pp. 319–327, Nordsiek et al "Stable Crosslinks by Dithioalkane Vulcanization—Route to Heat Resistant Diene Elastomers".
Z. Krebsforschung 69, (month unavailable) 1967, pp. 103–201, Druckrey et al, Organotrope Carcinogene Wirrkungen bei 65 verschieden N–Nitroso–Verbindungenen an BD–Ratten.

* cited by examiner

Primary Examiner—Robert D. Harlan
(74) Attorney, Agent, or Firm—Godfried R. Akoril; Jennifer R. Seng

(57) ABSTRACT

This invention relates to vulcanizable diene rubber compounds with a high capacity for the addition of sulfur to be varied while processing safety is maintained, for the production of improved rubber moldings, particularly tire components.

14 Claims, No Drawings

DIENE RUBBER COMPOUNDS FOR IMPROVED RUBBER MOLDINGS

FIELD OF THE INVENTION

This invention relates to vulcanizable diene rubber compounds which exhibit a high capacity for the addition of sulfur to be varied while processing safety is maintained, for the production of improved rubber moldings, particularly tire components.

BACKGROUND OF THE INVENTION

Due to the dynamic stresses on a tire, tire components require good thermal and mechanical stability in order to ensure good durability of the tire. With regard to mechanical stability, a high modulus and a high resistance to tear propagation, in particular, are desirable at a given hardness of the vulcanized material.

The economics of the use of tires, particularly truck tires, is to a major extent determined by the total number of possible remolds of the tire tread. Repeated remolding of the tire tread is only possible, however, to the extent which is permitted by the stressed carcass of the tire.

$\alpha,\omega$-bis(N,N'-diethylthiocarbamoyldithio)-alkanes and 1,2-bis(N,N'-dibenzylthio-carbamoyldithio)-ethane are known from Patent Applications EP 385 072, EP 385 073, EP 432 405 and EP 432 417 as crosslinking agents for diene rubber for the production of tire treads and tire sidewalls. A common feature of diethylamine derivatives is that they can release diethylamine during the vulcanization of the rubber compound. Diethylamine can form diethylnitrosamine, which is carcinogenic to humans. 1,2-bis-(N,N'-dibenzylthiocarbamoyldithio)-ethane is not, in fact, capable of forming dibenzylnitrosamine, which is carcinogenic to humans (see Druckrey et al., Z. Krebsforschung 69 (1967) 103), but based on the teaching of DE 22 56 511 the possibility cannot be ruled out for this compound, with its 1,2-dithioethanediyl radical, resulting in malodorous vulcanized materials (see page 17, paragraph 2), whereas $\alpha,\omega$-dithioalkanediyl radicals which comprise more than 4 carbon atoms result in vulcanized materials which result in no problems as with respect to odor.

In the aforementioned European Patent Applications, the crosslinking agents were used without sulfur additives. It is mentioned that the additional use of sulfur generally results in no advantages, since the reversion behavior of the vulcanized materials deteriorates.

EP 530 590 discloses a method of producing vulcanized diene rubber materials with a crosslinking agent system consisting of 1 to 4.5 parts by weight of 1,2-bis(N,N'-dibenzylthiocarbamoyldithio)-ethane or of 1,6-bis(N,N'-dibenzylthiocarbamoyldithio)-hexane, 0.05 to 0.3 parts by weight sulfur, and selected amounts of vulcanization accelerators. The particular teaching of the aforementioned patent is that the amount of crosslinking agent used can be reduced (economic aspects) by the use of very small amounts of sulfur, and that elastomers which exhibit a resistance to aging and reversion which was unattainable can be obtained with the avoidance of bloom phenomena and after relatively short times of vulcanization (page 7, lines 25 to 27). Vehicle tires and engine mountings are cited as examples of the use of vulcanized materials such as these.

Furthermore, DE 22 56 511 contains a very general discussion of the use of compounds of general formula A —S—S—R—S—S—A' for the vulcanization of rubbers, wherein R constitutes almost any divalent organic radical, and A and A' constitute a very large number of accelerator radicals, which also include N-substituted thiocarbamoyl radicals amongst others. The crosslinking agents can be used on their own or can also be used in combination with sulfur and vulcanization accelerators. The addition of elemental sulfur preferably falls within the range from 0.5 to 1.5 parts by weight sulfur with respect to 100 parts by weight rubber. Page 32, paragraph 2 contains the teaching that the crosslinking agents of the invention, in combination with amounts of sulfur greater than 1.5 parts by weight, result in a decrease in the level of processing safety of these rubber compounds.

One measure of the level of processing safety is the Mooney scorch time. A short Mooney scorch time signifies a low level of processing safety, whereas a long Mooney scorch time signifies a high level of processing safety. A high level of processing safety of rubber compounds is very desirable, because the addition of vulcanization retarders can thereby be dispensed with.

It is shown in DE 22 56 511, using master batch A (an NR compound), that the rubber compound according to Example 7 of Table VII, which comprises 1.0 parts by weight 1,2-bis-N,N'-dimethylthio-carbamoyldithio)-ethane and 1.7 parts by weight sulfur, has a Mooney scorch time ($t_5$/121° C.) of only 25.7 minutes. Compared with this, the compound according to Example 1 of Table III (control example), which comprises 2.0 parts by weight sulfur and 0.5 parts by weight Santocure NS (benzothiazyl-2-tert.-butylsulphenamide, TBBS) as an accelerator, has a corresponding Mooney scorch time of 32.0 minutes, i.e. the level of processing safety of the rubber compound in Example 7 of Table VII, which comprises 1.7 parts by weight sulfur, has actually become inferior to that of the control example. As evidenced by Example 6 in Table VII, there is in fact a deterioration of the level of processing safety even at an addition of sulfur of more than 1.0 part by weight, as measured on the control compound (see Example 1, Table III). Rubber compounds which contain the crosslinking agents of the invention are suitable for the bonding or agglutination of natural or synthetic textile fibers (page 35, paragraph 2).

As described at the outset, there is, therefore, a pressing need for vulcanizable rubber compounds for the production of improved tire components, particularly with respect to industrial hygiene, processing safety of the rubber compound, and the mechanical and dynamic property profiles and aging behavior of vulcanized materials.

SUMMARY OF THE INVENTION

The object of the present invention is to provide vulcanizable rubber compounds, which exhibit a high capacity for the addition of sulfur to be varied while maintaining high processing safety, for the production of improved tire components. The rubber compounds according to the invention release no nitrosamines during vulcanization which are carcinogenic to humans. The vulcanized materials resulting from the rubber compounds are free from undesirable odors of organosulfur compounds, and not only do the vulcanized materials exhibit no deterioration, or exhibit only a slight deterioration in their technological properties during aging, but they are even improved before aging with respect to modulus and resistance to tear propagation, or their modulus remains virtually of the same standard while their resistance to tear propagation is improved without any deterioration in the standard of their other important technological properties, such as the loss factor tan $\delta$ at 70° C. or the heat build-up.

In this connection, it should be mentioned that the modulus and the resistance to tear propagation are usually diametrically opposed to each other, i.e. vulcanized materials with a high modulus usually exhibit a low resistance to tear propagation, and vice versa.

The object of the present invention has surprisingly been achieved by the vulcanization of a rubber compound based on diene rubbers which comprise a special crosslinking agent which provides $C_6$-bridges, in combination with a selected amount of sulfur, and in the presence of vulcanization accelerators.

The present invention therefore relates to vulcanizable rubber compounds based on diene rubbers and customary additives, which are characterized in that the vulcanizing system contained in the compounds comprises
a) 0.5 to 3.8 parts by weight of compound (I)

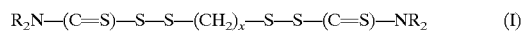  (I)

where $R=(C_6H_5CH_2)$;
and X=6,
b) 0.5 to 2 parts by weight sulfur and
c) 0.5 to 3.0 parts by weight of vulcanization accelerators, wherein the parts by weight are given in each case with respect to the use of 100 parts by weight of rubber.

DETAILED DESCRIPTION OF THE INVENTION

The synthesis of chemical compound (I) of the crosslinking agent is described in principle in EP 0 432 405.

The rubber compound according to the present invention is produced in the manner known in the art by the customary mixing of the rubber components with known additives or supplementary materials, such as carbon black, plasticizers, antidegradants, zinc oxide, stearic acid or resins, as well as with the vulcanizing system, wherein the additives are used in customary amounts.

The following should be cited as diene rubbers in the present invention: natural rubber (NR), isoprene rubber (IR) and butadiene rubber (BR), as well as styrene-butadiene rubber (SBR) which can be produced either by the emulsion method or by the solution method. Equally good results are also obtained by using blends of these rubbers with each other.

With regard to diene rubber blends, a blend comprising 90 to 50 parts by weight, preferably 80 to 60 parts by weight, of NR, and 10 to 50 parts by weight, preferably 20 to 40 parts by weight, of BR, is particularly preferred.

The types of NR which are customarily used in the tire industry are suitable as NRs for the rubber compound according to the invention.

A BR which is particularly suitable for the rubber compound according to the invention is one which has a cis-1,4 content of 30 to 100 parts by weight, preferably of 90 to 100 parts by weight, per 1100 parts by weight of rubber.

BR can be used in clear form or in oil-extended form. The use of clear BR is preferred.

Chemical compound (I) is used in amounts from 0.5 to 3.8 parts by weight, preferably in amounts from 0.5 to 3.5 parts by weight. The sulfur, which is customarily used in the rubber processing industry, or even insoluble sulfur, is suitable as the sulfur. The preferred amount of sulfur ranges from 0.5 to 2 parts by weight, more preferably from 0.5 to 1.5 parts by weight, with respect to 100 parts by weight of rubber used.

Known sulfur donors, for example, caprolactam disulphide, and admixtures thereof with sulfur, can also of course be used. The amount of sulfur donor, which is most favorable for the purpose of use, can easily be determined by preliminary tests.

Very different types of vulcanization accelerators can be used, and are subject to no restriction. Mercaptobenzthiazole (MBT), dibenzothiazyl disulphide (MBTS), sulphenamides based on MBT, such as benzothiazyl-2-cyclohexylsulphenamide (CBS), benzothiazyl-2-dicyclohexyl-sulphenamide (DCBS), benzothiazyl-2-tert.-butylsulphenamide (TBBS) and benzothiazyl-2-sulphenomorpholide (MBS) are preferably used. The vulcanization accelerators are used in amounts of 0.5 to 3.0 parts by weight, preferably 0.5 to 2.5 parts by weight, with respect to 100 parts by weight of rubber used.

A mixture of CBS and MBS is preferably used. Mixtures of other vulcanization accelerators can also be used, however, the optimum composition with respect to the type and amount thereof can easily be determined by experiment.

Vulcanization of the rubber compound according to the present invention is effected in the known manner at temperatures from about 120° to 220° C., preferably from 140° to 200° C.

The rubber compounds according to the present invention can be used for the production of rubber moldings, particularly tire components, and are most preferably used for the production of improved apeces, sidewall strips and chafer strips, shoulder cushions, belt strips, sidewall inserts and tread slape bases, as well as for the treads of tires, particularly truck tires.

The invention is further illustrated but is not intended to be limited by the following examples in which all parts and percentages are by weight unless otherwise specified.

EXAMPLES

Details of the Experimental Methods Used

The following test methods or test devices were used: Mooney viscosity: DIN 53 523, large rotor, 100° C., pre-heat time 1 minute, test duration 4 minutes. Mooney scorch: DIN 53 523, large rotor, 130° C., pre-heat time 1 minute. Rheometer: ASTM D 2084, Monsanto MDR 2000 E, 170° C. Tensile testing: DIN 53 405, dumb-bell. Hardness: DIN 53 505. Rebound resilience: DIN 53 512. Dynamic properties: DIN 53 533, Goodrich Flexometer, 100° C./25 minutes, pre-strain 1 MPa, stroke 4.45 rpm. Viscoelastic properties: DIN 53 513/ISO 4664, Roelig Test, 10 Hz.

Examples 1–4

The test compounds listed in Table 1 were produced using an internal mixer Type GK 1,5 E manufactured by Wemer & Pfleiderer, at a rotor speed of 40 rpm and at a chamber and blade temperature of 50° C. (ram pressure 8 bar, degree of filling 65%). The quantities are given in parts by weight per 100 parts by weight rubber.

TABLE 1

| | Test formulations | | | |
|---|---|---|---|---|
| Compound Number | Example 1 (Comparison 1) | Example 2 | Example 3 | Example 4 (Comparison 2) |
| NR[a)] | 80 | 80 | 80 | 80 |
| BR[b)] | 20 | 20 | 20 | 20 |

TABLE 1-continued

Test formulations

| Compound Number | Example 1 (Comparison 1) | Example 2 | Example 3 | Example 4 (Comparison 2) |
|---|---|---|---|---|
| Carbon black N234 | 40 | 40 | 40 | 40 |
| Silica[c] | 8 | 8 | 8 | 8 |
| Zinc oxide[d] | 10 | 10 | 10 | 10 |
| Plasticizer[e] | 3 | 3 | 3 | 3 |
| Tackifier[f] | 2 | 2 | 2 | 2 |
| 6PPD[g] | 1.8 | 1.8 | 1.8 | 1.8 |
| TMQ[h] | 1.2 | 1.2 | 1.2 | 1.2 |
| Stearic acid | 0.75 | 0.75 | 0.75 | 0.75 |
| Resorcinol formulation (66.6%)[i] | 1.2 | 1.2 | 1.2 | 1.2 |
| HMT[j] | 0.6 | 0.6 | 0.6 | 0.6 |
| CBS[k] | 0.7 | 0.7 | 0.7 | 0.7 |
| MBTS[l] | 0.3 | 0.3 | 0.3 | 0.3 |
| Sulfur | 3 | 1 | 0.5 | 0.5 |
| Cross-linking agent (I) | 0 | 2 | 3 | 4 |

[a] TSR 5, Defo 700
[b] Buna ® CB 25 manufactured by Bayer A G, Leverkusen, Germany, cis-1,4 content: 96% min., Mooney viscosity ML (1 + 4) 100° C. = 44
[c] Vulkasil ® S manufactured by Bayer A G, Leverkusen, Germany, BET specific surface area: 155–195 m²/g, pH 5.4–7.0
[d] zinc oxide RS manufactured by Grillo Zinkoxide GmbH, Goslar, Germany
[e] Enerthene ® 1849/1 (aromatic mineral oil) manufactured by BP Oil Deutschland GmbH, Hamburg
[f] Koresin ® powder manufactured by BASF A G, Mannheim, Germany
[g] Vulkanox ® 4020/LG (N-(1,3-dimethylbutyl)-N'-phenyl-p-phenylenediamine) manufactured by Bayer A G, Leverkusen, Germany
[h] Vulkanox ® HS/LG (polymerized 2,2,4-trimethyl-1,2-dihydroquinoline) manufactured by Bayer A G, Leverkusen, Germany
[i] Cohedur ® RS manufactured by Bayer A G, Leverkusen, Germany
[j] Cohedur ® H30 (hexamethylenetetramine, HMT) manufactured by Bayer A G, Leverkusen, Germany
[k] Vulkacit ® CZ/C (benzothiazyl-2-cyclohexylsulphenamide, CBS) manufactured by Bayer A G, Leverkusen, Germany
[l] Vulkacit ® DM (dibenzothiazyl disulphide, MBTS) manufactured by Bayer A G, Leverkusen, Germany The mixing sequence for the preparation of the compounds was selected as follows:

| | |
|---|---|
| t = 0 sec | addition of polymers |
| t = 10 sec | ram down |
| t = 30 sec | ram up, addition of carbon black and plasticizer, ram down |
| t = 90 sec | ram up, addition of silica, zinc oxide, tackifier, antidegradants, stearic acid and resorcinol, ram down |
| t = 210 sec | sweep |
| t = 240 sec | dump. |

On emptying the kneader, the temperatures of the mixed materials were within the range from 91 to 92° C.

HMT, as well as the vulcanization system consisting of sulfur, CBS, MBTS and crosslinking agent (I) were mixed in on a roll at a mixing temperature of about 60° C.

The rheological data which were determined on the finished rubber compounds are given in Table 2.

TABLE 2

Rheological data on test compounds

| Compound number | Example 1 (Comparison 1) | Example 2 | Example 3 | Example 4 (Comparison 2) |
|---|---|---|---|---|
| ML (1 + 4) 100° C. (MU) | 64 | 69 | 67 | 73 |
| Scorch time (120°) $t_5$ (min) | 15.3 | 23.3 | 28.0 | 29 |
| Rheometer 150° C. | | | | |
| ts01 (min) | 2.1 | 3.5 | 4.5 | 4.5 |
| t95 (min) | 10.1 | 9.0 | 12.9 | 13.4 |
| Smin (dNm) | 1.6 | 2.6 | 2.6 | 2.5 |
| S'max (dNm) | 17.9 | 19.5 | 18.6 | 19.8 |
| Send, 30 min (dNm) | 17.6 | 19.3 | 18.5 | 19.7 |
| Rheometer 180° C. | | | | |
| ts01 (min) | 0.5 | 0.7 | 0.9 | 0.9 |
| t95 (min) | 1.7 | 1.7 | 2.4 | 2.5 |
| Smin (dNm) | 1.4 | 2.4 | 2.3 | 2.3 |
| S'max (dNm) | 17.7 | 18.1 | 17.1 | 18.4 |
| Send 30 min (dNm) | 11.1 | 17.0 | 16.7 | 18.2 |

The rubber compounds according to the present invention were vulcanized at 150° C. (vulcanization time: t95+mold-related warming-up time). The test results on the vulcanized materials are given in Table 3.

TABLE 3

Properties of vulcanized test products

| Vulcanized product number | Example 1 (Comparison 1) | Example 2 | Example 3 | Example 4 (Comparison 2) |
|---|---|---|---|---|
| Tensile strength (MPa) | 21 | 24 | 22 | 20 |
| Elongation at break (%) | 440 | 452 | 423 | 382 |
| Modulus 100 (MPa) | 2.4 | 2.8 | 2.7 | 2.9 |
| Modulus 300 (MPa) | 12.4 | 14.2 | 13.9 | 14.7 |
| Resistance to tear propagation (N/mm) | 28 | 41 | 45 | 25 |
| Hardness, 23° C. (Shore A) | 65 | 66 | 64 | 66 |
| Hardness, 70° C. (Shore A) | 63 | 64 | 62 | 64 |
| Rebound resilience, 23° C. (%) | 60 | 62 | 59 | 63 |
| Rebound resilience, 70° C. (%) | 69 | 73 | 72 | 73 |
| Goodrich flexometer: | | | | |
| temperature increase (° C.) | 11 | 8 | 8 | 9 |
| Flow (%) | 5.3 | 0.9 | 0.6 | 1.0 |
| Permanent set | 7.1 | 1.6 | 1.6 | 1.2 |

TABLE 3-continued

Properties of vulcanized test products

| Vulcanized product number | Example 1 (Comparison 1) | Example 2 | Example 3 | Example 4 (Comparison 2) |
|---|---|---|---|---|
| (%) | | | | |
| *Roelig test:* | | | | |
| Tan δ, 0° C. | 0.113 | 0.104 | 0.104 | 0.108 |
| Dyn. modulus E', 0° C. (MPa) | 6.38 | 6.76 | 6.63 | 7.09 |
| Loss modulus E", 0° C. (MPa) | 0.723 | 0.700 | 0.689 | 0.767 |
| Tan δ, 70° C. | 0.043 | 0.035 | 0.041 | 0.050 |
| Dyn. modulus E', 70° C. (MPa) | 5.91 | 6.23 | 5.95 | 6.28 |
| Loss modulus E", 70° C. (MPa) | 0.254 | 0.243 | 0.242 | 0.311 |

The examples teach that the rubber compounds according to the present invention exhibit a high level of processing safety, and result in vulcanized materials with an improved modulus and with an improved resistance to tear propagation at the same time, and in addition, exhibit low heat build-up and a low tan δ at 70° C.

Example 5

The procedure was the same as that used in Example 2 of Table 1, except that 2.0 parts by weight of sulfur were used instead of 1.0 parts by weight of sulfur and 1.0 part by weight of crosslinking agent (1) was used instead of 2.0 parts by weight of crosslinking agent (I).

The Mooney viscosity ML (1+4) 100° C. of the compound obtained was 66 and the Mooney scorch time $t_5$ was determined as 21 minutes at 120° C.

After the corresponding vulcanization of the compound, the modulus 100 was 3.2 MPa; the resistance to tear propagation was 37 N/mm; and the temperature increase in the Goodrich Flexometer was determined to be 8° C. The Roelig test gave a tan δ of 0.035 at 70° C.

This example teaches that, compared with the control compound (see Example 1), rubber compounds according to the present invention even exhibit excellent processing safety when the addition of sulfur amounts to 2.0 parts by weight per 100 parts by weight of rubber.

Examples 6 and 7

The test compounds listed in Table 4 were produced using the internal mixer described in Examples 1–4 at a rotor speed of 40 rpm and at a chamber and blade temperature of 50° C. (ram pressure 8 bar, degree of filling 65%). The quantities are given in parts by weight per 100 parts by weight rubber.

TABLE 4

Test formulation

| Compound number | Example 6 1 (Comparison) | Example 7 2 |
|---|---|---|
| NR[a] | 100 | 100 |
| Carbon black N375 | 50 | 50 |
| Zinc oxide[d] | 5 | 5 |
| Plasticizer[e] | 3 | 3 |
| 6PPD[g] | 2 | 2 |
| TMQ[h] | 1 | 1 |
| Stearic acid | 1 | 1 |
| Microcrystalline wax[m] | 1 | 1 |
| CBS[k] | 1 | 1 |
| Sulfur | 1.5 | 0.8 |
| Crosslinking agent (I) | 0 | 1.5 |

[a]SMR 5, masticated
[d], [e], [g], [h], [k]see the legend of Table 1
[m]Antilux ® 654 manufactured by Rhein Chemie Rheinau GmbH, Mannheim The mixing sequence for the preparation of the compounds was selected as follows:

| | |
|---|---|
| t = 0 sec | addition of polymers |
| t = 10 sec | ram down |
| t = 60 sec | ram up, addition of carbon black, plasticizer, zinc oxide, stearic acid, ram down |
| t = 120 sec | ram up, addition of antidegradants and wax, ram down |
| t = 180 sec | sweep |
| t = 240 sec | dump |

On emptying the kneader the temperatures of the mixed materials were within the range from 112° to 114° C.

The vulcanization system consisting of sulfur, accelerator and crosslinking agent (1) was mixed in on a roll at a mixing temperature of about 65° C.

The rheological data which were determined on the finished mixed rubber compounds are given in Table 5.

TABLE 5

Rheological data of the test compounds

| Compound number | Example 6 1 (Comparison) | Example 7 2 |
|---|---|---|
| ML (1 + 4) 100° C. (MU) | 75 | 73 |
| Scorch time (120° C.) $t_5$ (min) | 21 | 26 |
| *Rheometer, 160° C.* | | |
| ts01 (min) | 1.6 | 2.1 |
| t90 (min) | 3.6 | 4.0 |
| t95 (min) | 4.0 | 4.9 |
| Smin (dNm) | 3.4 | 3.2 |
| S'max (dNm) | 16.8 | 17.8 |
| Send, 30 min (dNm) | 13.7 | 18.0 |
| Reversion (%) | 18 | 0 |
| *Rheometer, 180° C.* | | |
| ts01 (min) | 0.5 | 0.8 |
| t90 (min) | 1.1 | 1.5 |
| t95 (min) | 1.2 | 1.9 |
| Smin (dNm) | 3.3 | 2.9 |
| S'max (dNm) | 16.4 | 16.6 |
| Send, 30 min (dNm) | 10.8 | 15.7 |
| Reversion (%) | 34 | 5 |

The reversion was calculated as follows: (S'max−Send)/S'max×100%

The rubber compounds were vulcanized at 160° C. (vulcanization time: t95+mold-related warming-up time). The test results for the vulcanized materials are given in Table 6.

TABLE 6

Properties of vulcanized test products

| Vulcanized product number | Example 6 (Comparison) | Example 7 2 |
|---|---|---|
| Tensile strength (MPa) | 27 | 28 |
| Elongation at break (%) | 550 | 529 |
| Modulus 100 (MPa) | 2.1 | 2.8 |
| Modul 300 (MPa) | 11.5 | 13.4 |
| Hardness, 23° C. (Shore A) | 67 | 68 |
| Hardness, 70° C. (Shore A) | 61 | 62 |
| Rebound resilience, 23° C. (%) | 43 | 40 |
| Rebound resilience, 70° C. (%) | 56 | 52 |
| Resistance to tear propagation (N/mm) | 38 | 92 |
| Abrasion (Emery 40) (mm$^3$) | 161 | 112 |
| Goodrich flexometer: | | |
| Temperature increase (° C.) | 27 | 21 |
| Flow (%) | 8.7 | 2.3 |
| Roelig test: | | |
| tan δ, 0° C. | 0.215 | 0.222 |
| Dyn. modulus E', 0° C. (MPa) | 8.649 | 9.847 |
| Loss modulus E", 0° C. (MPa) | 1.859 | 2.188 |
| tan δ, 70° C. | 0.110 | 0.111 |
| Dyn. modulus E', 70° C. (MPa) | 5.229 | 5.896 |
| Loss modulus E", 70° C. (MPa) | 0.577 | 0.656 |

The example teaches that the rubber compound according to the invention exhibits improved processing safety and results in a vulcanized material with improved abrasion resistance (the lower the abrasion, the higher the abrasion resistance) and an improved modulus together with improved resistance to tear propagation. In addition the vulcanized material according to the invention exhibits lower heat build-up.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A vulcanizable rubber compound based on diene rubbers comprising a vulcanizing system contained in the compounds comprising
   a) 0.5 to 3.8 parts by weight of compound (I)

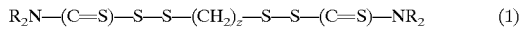
   $$R_2N-(C=S)-S-S-(CH_2)_x-S-S-(C=S)-NR_2 \quad (1)$$

wherein R=($C_6H_5CH_2$);
   and X=6;
   b) 0.5 to 2 parts by weight sulfur, and
   c) 0.5 to 3.0 parts by weight of at least one vulcanization accelerator wherein the parts by weight are given in each case with respect to 100 parts by weight of rubber.

2. A vulcanizable rubber compound according to claim 1, wherein said compound (I) is present in an amount of 0.5 to 3.5 parts by weight.

3. A vulcanizable rubber compound according to claim 1, wherein said sulfur is present in an amount of 0.5 to 1.5 parts by weight.

4. A vulcanizable rubber compound according to claim 1, wherein said at least one vulcanization accelerator is present in an amount of 0.5 to 2.5 parts by weight.

5. A vulcanizable rubber compound according to claim 1, wherein said at least one vulcanization accelerator is selected from the group consisting of mercaptobenzthiazole (MBT), dibenzothiazyl disuiphide (MBTS), sulphenamides based on MBT or mixtures thereof.

6. Rubber moldings comprising vulcanizable rubber compounds based on diene rubbers and customary additives, comprising a vulcanizing system contained in the compounds comprising
   a) 0.5 to 3.8 parts by weight of compound (n)

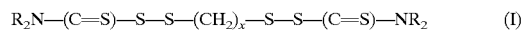
   $$R_2N-(C=S)-S-S-(CH_2)_x-S-S-(C=S)-NR_2 \quad (I)$$

wherein R=($C_6H_5CH_2$);
   and X=6;
   b) 0.5 to 2 parts by weight sulfur; and
   c) 0.5 to 3.0 parts by weight of at least one vulcanization accelerator wherein the parts by weight are given in each case with respect to 100 parts by weight of rubber.

7. Rubber moldings according to claim 6, wherein said compound (I) is present in an amount of 0.5 to 3.5 parts by weight.

8. Rubber moldings according to claim 6, wherein said sulfur is present in an amount of 0.5 to 1.5 parts by weight.

9. Rubber moldings according to claim 6, wherein said vulcanization accelerators are present in an amount of 0.5 to 2.5 parts by weight.

10. Rubber moldings according to claim 6, wherein said at least one vulcanization accelerator is selected from the group consisting of mercaptobenzthiazole (MBT) or mixtures thereof.

11. Rubber moldings according to claim 6, wherein said rubber molding is a molding for a tire component.

12. The vulcanizable rubber compound according to claim 1, wherein the compound further comprises a rubber additive(s).

13. The vulcanizable rubber compound according to claim 5, wherein the sulphenamide comprising MBT is selected from the group consisting of benzothiazyl-2-cyclohexylsulphenamide (CBS), benzothiazyl-2-dicyclohexyl-sulphenamide (DCBS), benzothiazyl-2-tert.-butylsulphen-amide (TBBS) and benzothiazyl-2-sulphenomorpholide (MBS) or mixtures thereof.

14. The rubber moldings according to claim 10, wherein the sulphenamide comprising MBT is selected from the group consisting of benzothiazyl-2-cyclo-hexylsulphenamide (CBS), benzothiazyl-2-dicyclohexyl-sulphenamide (DCBS), benzothiazyl-2-tert.-butylsulphen-amide (TBBS) and benzothiazyl-2-sulpheno-morpholide (MBS) or mixtures thereof.

* * * * *